(12) United States Patent
Flandre et al.

(10) Patent No.: US 7,504,793 B2
(45) Date of Patent: Mar. 17, 2009

(54) DC MOTOR DRIVING METHOD FOR REDUCING ADVERSE RF INTERFERENCES AND APPLICATION TO A VEHICLE LIGHTING OR SIGNALING DEVICE

(75) Inventors: Loic Flandre, Bobigny (FR); Stephan Baudru, Bobigny (FR); David Boudikian, Bobigny (FR)

(73) Assignee: Valeo Vision, Bobigny (FR)

( * ) Notice: Subject to any disclaimer, the term of this patent is extended or adjusted under 35 U.S.C. 154(b) by 409 days.

(21) Appl. No.: 11/039,606

(22) Filed: Jan. 19, 2005

(65) Prior Publication Data

US 2005/0162876 A1 Jul. 28, 2005

(30) Foreign Application Priority Data

Jan. 20, 2004 (FR) .................. 04 00478

(51) Int. Cl.
*H02M 1/12* (2006.01)
(52) U.S. Cl. .................. 318/480; 361/23; 361/679; 307/10.8
(58) Field of Classification Search .......... 307/9.1, 307/10.1, 10.8; 361/1, 23, 143, 152, 679; 318/480, 487, 558, 685, 696
See application file for complete search history.

(56) References Cited

U.S. PATENT DOCUMENTS

| 5,517,388 | A | | 5/1996 | Hutchisson |
| 5,661,390 | A | * | 8/1997 | Lipo et al. .................. 318/803 |
| 5,713,541 | A | * | 2/1998 | Schmitz et al. ......... 246/187 A |
| 5,838,877 | A | | 11/1998 | Elliot et al. |
| 5,990,654 | A | * | 11/1999 | Skibinski et al. ............ 318/800 |
| 6,150,789 | A | * | 11/2000 | Pulford, Jr. .................. 318/685 |
| 6,323,564 | B1 | * | 11/2001 | Graf .......................... 307/10.1 |
| 6,381,153 | B1 | * | 4/2002 | Brussels ...................... 363/39 |
| 6,583,682 | B1 | * | 6/2003 | Dubhashi et al. ............. 333/12 |
| 7,202,622 | B2 | * | 4/2007 | Eskritt et al. ................ 318/437 |

FOREIGN PATENT DOCUMENTS

| DE | 197 25 743 C | 1/1999 |
| EP | 1 065 101 A | 1/2001 |
| JP | 2003-025904 A | 3/2003 |

* cited by examiner

*Primary Examiner*—Bentsu Ro
(74) *Attorney, Agent, or Firm*—Locke Lord Bissell & Liddell

(57) ABSTRACT

The invention concerns a method of controlling a control circuit, which comprises a step in which a variation in a control parameter for the control circuit is effected, said variation being determined so that at least one emission characteristic of an unfavorable electromagnetic radiation is reduced.

11 Claims, 3 Drawing Sheets

DC MOTOR DRIVING METHOD FOR REDUCING ADVERSE RF INTERFERENCES AND APPLICATION TO A VEHICLE LIGHTING OR SIGNALING DEVICE

FIELD OF THE DESCRIPTION

The present invention concerns a method of controlling a DC electric motor for reducing unfavourable radio-frequency emissions.

BACKGROUND OF THE INVENTION

The invention also concerns a vehicle lighting or signalling device of the type incorporating at least one control circuit generating unfavourable electromagnetic radiation and implementing the control method.

In the motor industry, use is being made more and more of electric motors which, according to their operating phase and according to the control circuit which controls them, may emit a large quantity of radio-frequency signals whose effect is undesirable both on the safety of operation of the other electronic circuits of the vehicle and on the radio environment in which the vehicle is travelling.

In particular, in the case of a stepping electric motor used for controlling the orientation of a lighting and/or signalling device, of the vehicle headlight type, it is necessary to produce a supply at a given frequency to enable the set position, once reached, to be maintained on the orientation of the headlight.

In this operating phase, the control circuit and the stepping motor, in particular when it is a case of a stepping motor for example with two coils or four coils, may radiate a large quantity of unfavourable electromagnetic radiation in frequency bands governed by current standards.

To remedy this drawback, it is known how to take several measures, separately or in combination according to circumstances, when the control circuit for the headlight orientation motor is designed.

SUMMARY OF THE INVENTION

According to a first measure, in fact, it is known that the unfavourable electromagnetic radiation is to a major extent emitted on the connectors and on the connection cables, whose length may in certain cases be high. This first measure for reducing the unfavourable radio emissions consists, as is known, of executing a shielding of the supply cable to the electric motor and/or its controller as well as, where necessary, its connectors. Moreover, such devices comprise more components and a problem of insulation in the cables is encountered.

According to a second measure, the various grounds of the motor, the control circuit and the supply cable or cables must be interconnected in an grounding operation which consists of ensuring that the various ground planes cannot vary in voltage during use and thus transform themselves into stray radiating structures.

According to a third measure, an inductor is added to the supply cable either in the form of a wound inductor or by benefiting from the distributed inductance using a plastoferrite ring surrounding a suitably chosen point on the supply cable.

These three measures have the drawback of requiring the fitting of additional components, which increase the material cost of the automobile function for which the anti-EMC protection is designed. In addition, when the function is manufactured and during its installation, and then during the maintenance of the vehicle, the provision of these measures presents a labour cost which must be as small as possible since anti-EMC protection is not a positive function but serves solely to reduce an intrinsic defect in an automobile function control technique.

Finally, the aforementioned second and third measures are not valid throughout the entire radiation spectrum, nor on the characteristics of the EMC spectrum which are the greatest nuisance.

It is to remedy these various drawbacks that the invention proposes a method of controlling a control circuit for an electric motor which does not have the aforementioned drawbacks, and proposing in particular an improved control mode for reducing unfavourable electromagnetic radiation.

This is because the invention is wherein it comprises the steps of:
  determining at least one operating phase of the control circuit during which unfavourable electromagnetic emissions exist; and
  varying, during the determined operating phase of the control circuit during which unfavourable electromagnetic emissions exist, a control parameter for the control circuit, the said variation being determined so that at least one emission characteristic of an unfavourable electromagnetic radiation is reduced.

The control parameter for the control circuit is preferably chosen from amongst the frequency, the pulse width or the pulse amplitude.

The emission characteristic is preferably chosen from amongst the amplitude of a signal at a given frequency or the power of a signal at a given frequency.

Advantageously, it is possible to perform an operation of averaging the amplitude or power of the signal over a predetermined frequency range, so as to transform a signal of the narrow band type into a signal of the broadband type.

The method according to the invention can comprise a prior step of selecting a control parameter for the control circuit such as the frequency, the pulse width or the pulse amplitude.

The method according to the invention can also comprise a step of selecting at least one given frequency for executing the selection of a control parameter for the control circuit such as the pulse width or the pulse amplitude.

The method according to the invention can comprise a step for performing an averaging operation on the control circuit control parameter over a predetermined range of frequencies, in particular so as to transform a characterisation of the control from narrow band to broadband.

Finally, the invention concerns a vehicle lighting or signalling device of the type incorporating at least one control circuit generating unfavourable electromagnetic radiation and implementing the control method. It concerns in particular the application of the method described above to systems for controlling movements of parts within a motor vehicle lighting and/or signalling device. It may be a case for example of movable shields making it possible, with a single light source, to produce beams of the main beam type or beams of the dipped beam type.

Other characteristics and advantages of the present invention will be understood better by means of the description and the accompanying drawings, amongst which:

DESCRIPTION OF THE PREFERRED EMBODIMENTS

Figure 1:
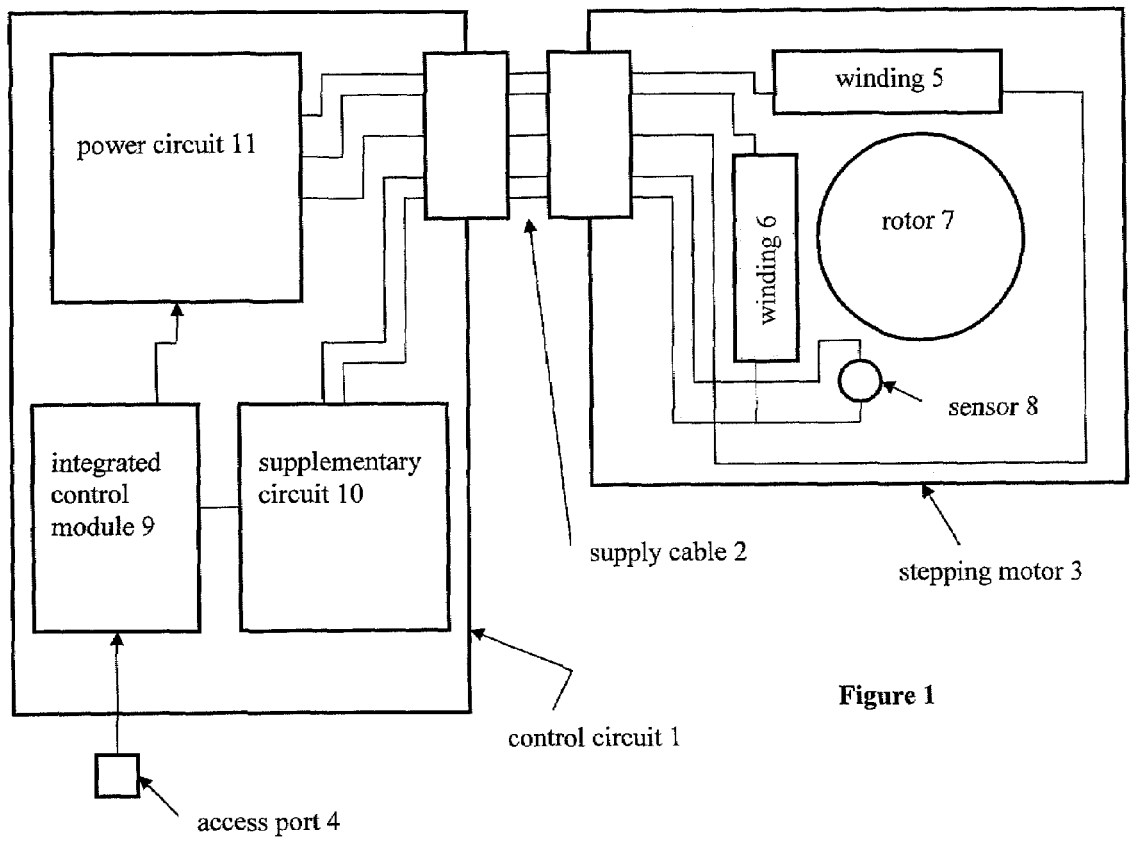
FIG. 1 depicts a device intended to implement the method of the invention.

FIG. 1 depicts a device intended to implement the method of the invention. It comprises essentially:
- a stepping motor 3 comprising two phases 5 and 6 and a position encoder 8, optionally;
- a control circuit 1 for the motor 3;
- a supply cable 2 connecting the control circuit 1 to the motor 3, as is known in the prior art.

An on-board computer (not shown) produces instructions to start and instructions to maintain in position which are transmitted by an access port 4 to the control circuit according to a communication protocol such as the SPI protocol or the CAN protocol. Conventionally, the on-board computer can correspond either to a vehicle on-board computer or to a computer allotted to the automobile function for which the motor 3 operates, such as a road lighting function. In the case of this function, the maintain instruction produced at the access port 4 causes the control circuit to pass into an operating phase during which the supply to the control circuit, in terms of current and/or voltage, will be cut up so as to be reconstructed in the form of a correct current or voltage on the windings 5 and 6 of the stepping motor and to maintain its position.

It is during this operating phase, in particular, that the problem of unfavourable electromagnetic emissions occurs and it is preferentially, but not exclusively, during this operating phase that the method of the invention will be applied.

The maintain instruction is interpreted on a circuit which transforms it into a repetition of the pulse width modulation PWM type, where applicable according to position information returned by the sensor 8 on a circuit for measuring the instantaneous position of the rotor 7. The PWM repetition is then applied as is known to a power circuit 11 such as a transistor bridge according to a given phase law, frequency and cycle ratio.

By directly using a device for controlling an electric motor of this design with pulse width modulation, the supply wires, in the cable 2 in particular, radiate electromagnetic waves in the radio-frequency spectrum which present a danger to the operating safety of the electronic circuit on the one hand and to the electromagnetic environment more generally, on the other hand.

However, for a given motor and control circuit, it has been found in the context of tests during the development of the invention that the profile of the spectrum of the unfavourable radio-frequency radiation was known for a given constant cycle ratio and frequency.

When two types of measurements of the unfavourable radiated field are made, it is possible to effect:

- a sequence of peak measurements of the radiated field according to the frequency of the entire spectrum ranging from long waves to medium radio waves;
- a sequence of peak average field measurements over predetermined frequency intervals covering the spectrum ranging from long waves to medium radio waves.

However, in order to meet the requirements for reducing unfavourable radio-frequency radiation, it is necessary for the curves representing the said measurement sequences to be situated, in predetermined frequency bands, below an acceptable limit profile chosen according to the type of measurements made in narrow band or broadband. It is of course possible to choose other characteristics of unfavourable electromagnetic radiation, in particular by choosing different frequency bands for calculating the average peaks. It is also possible to use measurements other than the peak voltages.

In general terms, the invention proposes varying a control parameter for the control circuit.

According to one aspect of the invention, the control method comprises a prior step of selecting a control parameter for the control circuit such as the frequency, the pulse width or the pulse amplitude.

According to another aspect of the invention, the control method also comprises a step of selecting at least one given frequency for executing the selection of a control parameter for the control circuit such as the pulse width or the pulse amplitude.

According to another aspect of the invention, the control method comprises a step for performing an averaging operation on the control parameter for the control circuit over a predetermined frequency range so as to transform a characterisation of the control from narrow band to broadband.

Figure 2:
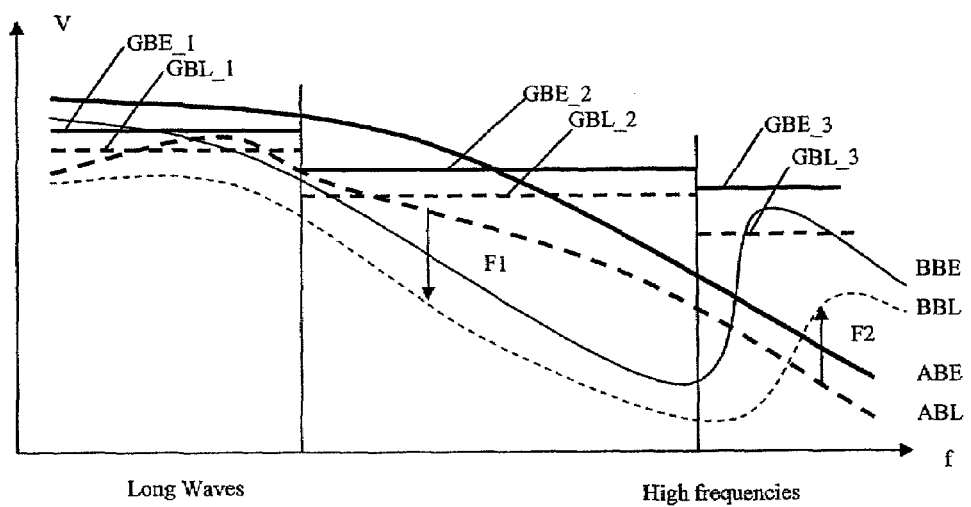
FIG. 2 depicts two series of curves corresponding respectively to the prior art and to the application of the method of the invention.

FIG. 2 depicts two series of curves, respectively:
- the curves ABE and ABL respectively characteristic of narrow-band measurements (ABE) and broadband measurements (ABL), these measurements being made on a control circuit to which the invention has not been applied but to which the conventional measures of the prior art have been applied;
- the curves BBE and BBL respectively characteristic of narrow-band measurements (BBE) and broadband measurements (BBL), these measurements being made on a control circuit to which the invention has been applied.

Two profiles have also been displayed, corresponding to acceptable radiation levels respectively GBE for narrow-band measurements and GBL for broadband measurements. A division of the profiles has also been shown in three frequency bands ranging from "long waves", typically 10 kHz, to "high frequencies", typically 10 MHz, which are referenced by way of example in the drawing, respectively for the narrow-band profile by GBE_1 to GBE_3 and for the broadband profile by GBL_1 to GBL_3.

In the example in FIG. 2, the curves ABE and ABL for measurement of unfavourable radiation of the prior art still present a problem of complying with their profiles on the low-frequency f side.

As will be disclosed, the application of the method of the invention by varying the control circuit control makes it possible to reduce the level of the measurements on the low-frequency side by removing spectral energy from this region of the radio spectrum at the crests or peaks of spectral lines in order to transfer them to higher attenuations. The effect of the invention towards the high frequencies is less appreciable. In addition, complying with constraining profiles is not as tricky as for low frequencies.

To this end, the principle of the invention makes it possible to reduce a spectral line in the direction of the arrow F1 on the low frequency side. A rise at least on a high-frequency modulation line in the direction of the arrow F2 is however noted.

The principle applies over the entire frequency range and for both narrow-band and broadband measurements.

Figure 3:
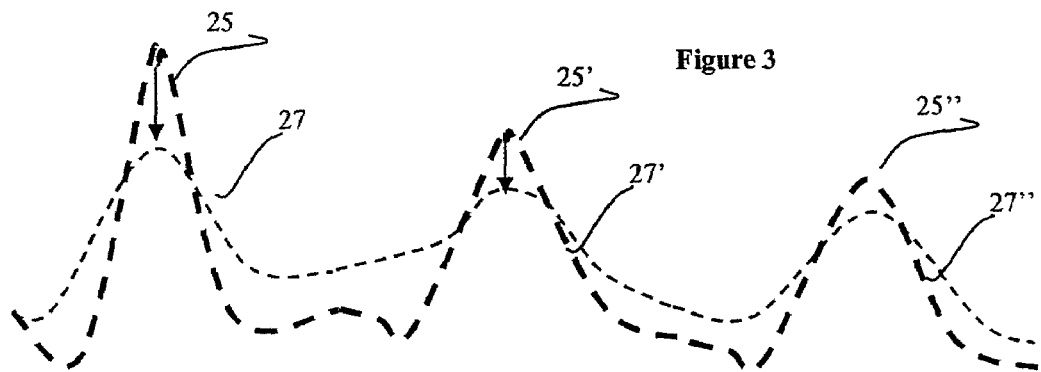
FIG. 3 is a part of a curve of one of the series of graphs explaining one embodiment of the invention.

FIG. 3 is a part of a curve of one of the series of graphs explaining one embodiment of the invention. In reality, the frequency measurements in narrow band or in averages over broadband result in the production of peaks and troughs.

Three peaks chosen arbitrarily on the curve ABE in FIG. 2 have been considered, namely peaks 25, 25' and 25" spaced out on the low frequency side.

The method of the invention therefore consists of choosing a variation law for the control of the control circuit described for example by means of FIG. 1 which makes it possible to reduce the peak 25 and consequently to spread out the peak 27 whilst reducing its upper amplitude and/or its amplitude relative to the troughs or lower peaks of the radio-frequency spectrum.

The effect of the application of this method has been measured over several measurement peaks and a new spectrum of narrow band measurements has always been obtained according to the new reduced peak 27, 27' and 27".

Figure 4:
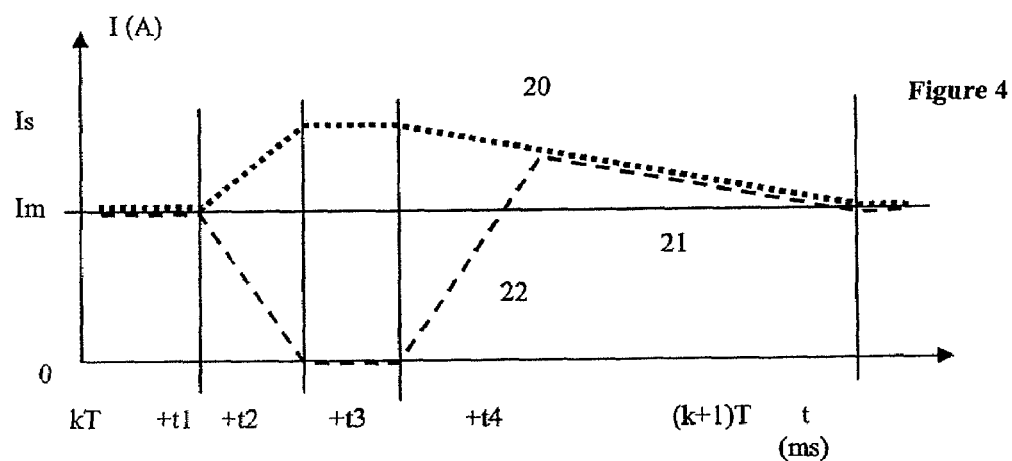
FIG. 4 depicts two graphs characteristic of two possible strategies applied in a first embodiment of the invention.

FIG. 4 depicts two graphs characteristic of two possible strategies applied in a first embodiment of the invention.

The control applied in one example embodiment already mentioned with the help of FIG. 1 uses the Pulse Width Modulation scheme in which a first part of a period with an active value and then a second part of the said period with an inactive state are determined. Particularly in the case of an operating mode of the device of FIG. 1 in the state of maintaining the position of the stepping motor 3, the pulse width modulation control by the control circuit 1 is effected with a repetition of constant width. This situation greatly generates unfavourable radiation which the application of the method of the invention makes it possible to reduce.

FIG. 4 shows the time t on the X-axis and the instantaneous value Im of the maintaining current generated by the control circuit on the Y-axis. The amplitude of the time on the X-axis has been reduced to a $k^{th}$ period of repetition of the control variation strategy according to the invention between kT and (k+1)T.

The horizontal line 21 corresponds to the value of the maintaining current which is obtained with a ratio R1 of the pulse width modulation scheme applied by the control circuit 1 according to its control 4.

According to a first control variation strategy according to the method of the invention, as depicted by the curve 20, over each period of duration T during the phase of maintaining the position of the stepping motor 3:

at a relative time +t1, an increase in the control output voltage is applied so that the maintaining current rises until a time +t2;

at a relative time +t2, the control for the maintaining current Im is once again maintained at a slightly greater constant value until a time +t3;

at a relative time +t3, a reduction in the control output voltage is applied so that the maintaining current returns to the initial value before the end of the period at time (k+1)T.

The cycle then resumes for the following period unless the operating phase for maintaining in position is terminated in accordance with an instruction determined by an on-board computer applied to the input 4.

According to a second control variation strategy according to the method of the invention, as depicted by the curve 22, over each period of duration T during the phase of maintaining the position of the stepping motor 3:

at a relative time +t1, a reduction in the control output voltage is applied so that the maintaining current is cancelled out progressively until a time +t2;

at a relative time +t2, the control for the maintaining current Im is once again maintained at a zero constant value until a time +t3;

at a relative time +t3, an increase in the control output voltage is applied so that the maintaining current returns to the initial value before the end of the period at time (k+1)T.

The cycle then resumes for the following period unless the operating phase for maintaining in position is terminated in accordance with an instruction determined by an on-board computer applied to the input 4.

In order to obtain the increases or reductions in the maintaining current, the method of the invention comprises a step for determining suitable choices of cycle ratios for the control circuit 1 making it possible to apply the first or second variation schemes for the control adapted to reducing the unfavourable radio-frequency radiation as explained in FIGS. 2 and 3.

Figure 5:
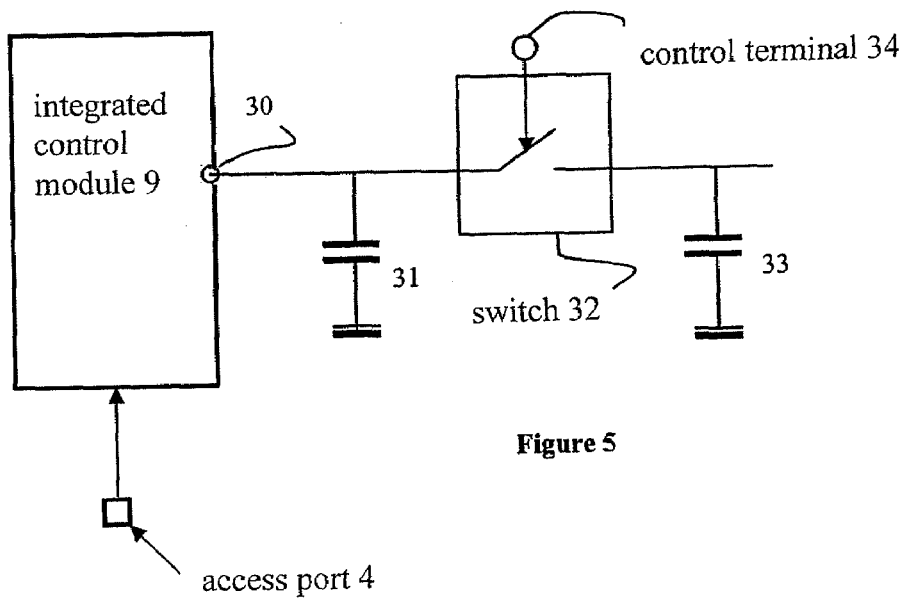
FIG. 5 is a diagram of a circuit implementing a first embodiment of the invention.

FIG. 5 is a diagram of a circuit implementing a first embodiment of the invention.

The control circuit 1 thus comprises, as explained with the help of FIG. 1, an integrated module 9 for producing pulse width modulation. Such a control circuit can for example be an L9935 circuit for a stepping motor from the company ST.

The integrated pulse width modulation module 9 must be charged by means of a capacitor 31 disposed between the electrical ground and a given terminal (terminal '15' in the case of the L9935 circuit) which makes it possible to vary the cycle ratio or the frequency around a base value fixed by the value of the external capacitor 31.

According to the invention, the control variation taught by the method of the invention is executed by switching one or more other capacitors such as the capacitor 33 by means of a controlled switch 32. A control terminal 34 of a switch 32 makes it possible to connect or not the capacitor 33 in parallel with the capacitor 31 so that the capacitance seen on the terminal 30 changes from the value C1 to the value (C1+C2). This reference capacitance variation is directly controlled by a computer, which applies the control method of the invention.

Figure 6:
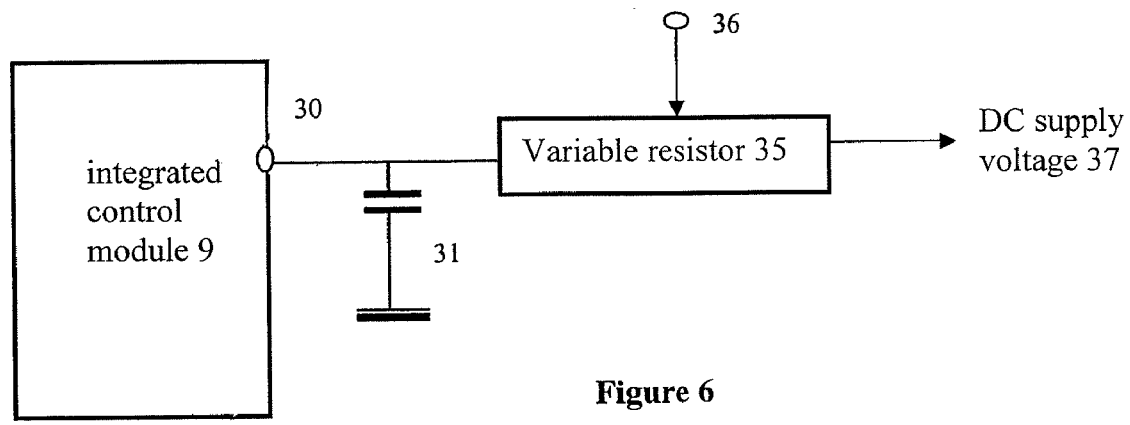
FIG. 6 is a diagram of a circuit implementing a second embodiment of the invention.

FIG. 6 is a diagram of a circuit implementing a second embodiment of the invention.

The same control circuit as that of FIG. 5 is used. According to the invention, the control variation taught by the method of the invention is executed by varying the time constant of a circuit charging the reference terminal of the integrated control module 9 as already described with the help of FIG. 5. To this end, a variable resistor 35 is connected between a DC supply voltage 37 and the aforementioned terminal 30. The variable resistor 35 has an ohmic value which can be determined by a control applied to a control electrode 36 connected to a computer implementing the control method of the invention. Such a resistor can be formed on the basis of a programmable memory such as the products from the company Xicor. As a result the resistance value R35 affects an RC cell composed of the variable resistor 35 and the aforementioned capacitor 31. As a result the integrated pulse width modulation module 9 of the control circuit 1 is charged by a time constant R35×C31, which can therefore be varied by control from the control computer, a suitable output port of which can be connected to the control electrode 36.

Figure 7:
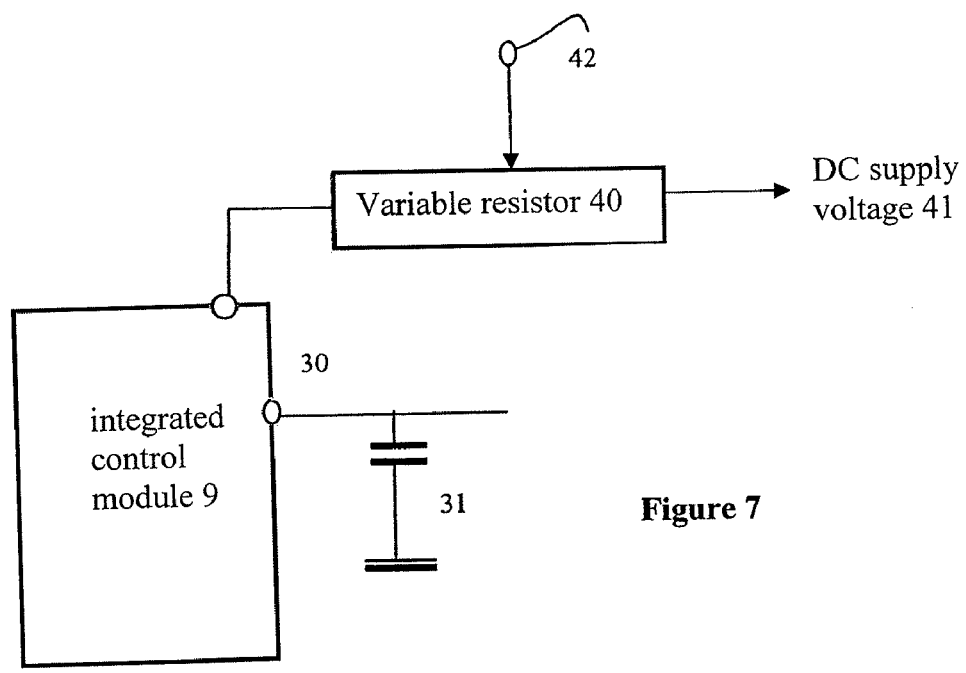
FIG. 7 is a diagram of a circuit implementing a third embodiment of the invention.

FIG. 7 is a diagram of a circuit implementing a third embodiment of the invention.

The same control circuit as that of FIG. 5 or 6 has been used. Such a circuit does however have a terminal supplying DC voltage 41, the variation of which is used to determine a variation in response of the cycle ratio and/or the frequency of the pulse width modulation scheme produced in the aforementioned integrated module.

To this end, the local varying of the bias voltage or supply voltage of the control circuit 1 is effected by means of a variable resistor 40, similar to the resistor 35 already described. This controllable resistor 40 comprises a control electrode 42 which can therefore be controlled from the control computer, a suitable output port of which can be connected to the control electrode 42.

Naturally, these control variation strategies can be applied to controls other than a pulse width modulation control.

Other devices can benefit from the control method of the invention, in particular a DC motor for a constant speed operating phase for example, or for other active loads which are liable, during at least part of their operation, to exhibit unfavourable radio-frequency emission.

The invention is preferentially applied to a vehicle headlight whose position or orientation determines the direction of the lighting beam emitted under the action of at least one electric motor connected to a control circuit. The electric motor control circuit 1 is then equipped with a supplementary circuit or stage 10, partially implemented by a control program and arrangements such as those described with the help of FIGS. 5 to 7. The control program is recorded in a program memory in contact with a microcontroller or a signal processor. The latter component then conventionally executes the control of the supply to the motor, in particular in order to maintain the position of the headlight. The supplementary stage 10 by program then applies the control variation as defined in the method of the invention, in particular, but not exclusively, during the phase of maintaining the position of the headlight.

The same arrangement is applicable for controlling the position of an optical shield installed on a headlight or on a signalling light, or controlling the position of a flap in a vehicle ventilation or air-conditioning installation.

What is claimed is:

1. Method of controlling a control circuit, comprising the steps of: determining at least one operating phase of the control circuit during which unfavourable electromagnetic emissions exist; and varying, during the determined operating phase of the control circuit during which unfavourable electromagnetic emissions exist, a control parameter for the control circuit, the variation being determined so that at least one emission characteristic of an unfavourable electromagnetic radiation chosen from amongst the amplitude of a signal at a given frequency or the power of a signal at a given frequency is reduced;

wherein an operation of averaging the amplitude or power of the signal over a predetermined frequency range is performed, so as to transform a signal of the narrow band type into a signal of the broadband type.

2. Method according to claim 1, wherein the control parameter for the control circuit is chosen from amongst the frequency, the pulse width or the pulse amplitude.

3. Method according to claim 1, comprising a step for determining a variation law for the control parameter for the control circuit in order to reduce a given frequency characteristic on the low frequency side by removing spectral energy from this region of the radio spectrum in order to average it over a predetermined frequency range.

4. Method according to claim 3, comprising a step for determining a variation repetition for the control.

5. Method according to claim 4, comprising a step for applying a control variation strategy over each period of duration: at a relative time, an increase in the output control voltage is applied until a time; at a relative time, the control is once again maintained at a slightly greater constant value until a time; at a relative time, a reduction in the output control voltage is applied so that the control returns to the initial value before the end of the period at time.

6. Method according to claim 5, wherein, in order to obtain the increases or reductions in the maintaining current, comprising a step for determining cycle ratios for controlling the control circuit adapted to reducing the unfavourable radio-frequency radiation.

7. Method according to claim 6, wherein the control variation is executed by varying the time constant of a charging circuit by means of a variable resistor whose value is determined by a control applied to a control electrode connected to a computer.

8. Method according to claim 4, comprising a step for applying a control variation strategy over each period of duration: at a relative time, a reduction in the output control voltage is applied until a time; at a relative time, the control is maintained at a zero constant value until a time; at a relative time, an increase in the control output voltage is applied so that the control returns to the initial value before the end of the period at time.

9. Method according to claim 1, wherein the control variation is executed by switching one or more capacitors by means of a controlled switch, so as to execute a reference capacitance variation directly controlled by a computer.

10. Method according to claim 1, wherein the control variation is executed by varying the voltage or current of a DC supply of the control circuit in order to determine a variation in response of the cycle ratio and/or of the frequency.

11. Application of the method according to claim 1 to systems for controlling movements of parts within a motor vehicle lighting and/or signalling device.

* * * * *